US008302181B2

(12) United States Patent
Kakutani et al.

(10) Patent No.: US 8,302,181 B2
(45) Date of Patent: Oct. 30, 2012

(54) IMAGE READING APPARATUS, AUTHENTICATION METHOD, EVALUATION SYSTEM, METHOD, AND COMPUTER PROGRAM PRODUCT

(75) Inventors: Hiroshi Kakutani, Ishikawa (JP); Seigo Kotani, Kawasaki (JP)

(73) Assignees: PFU Limited, Ishikawa (JP); FUJITSU Limited, Kanagawa (JP)

( * ) Notice: Subject to any disclaimer, the term of this patent is extended or adjusted under 35 U.S.C. 154(b) by 1247 days.

(21) Appl. No.: 11/621,900

(22) Filed: Jan. 10, 2007

(65) Prior Publication Data
US 2007/0172222 A1 Jul. 26, 2007

(30) Foreign Application Priority Data

Jan. 18, 2006 (JP) ................................ 2006-010356
Jun. 7, 2006 (JP) ................................ 2006-158720

(51) Int. Cl.
*H04L 29/06* (2006.01)
(52) U.S. Cl. ........................................................ 726/17
(58) Field of Classification Search .................... 726/17
See application file for complete search history.

(56) References Cited

U.S. PATENT DOCUMENTS

| 6,931,545 | B1 | 8/2005 | Ta et al. | |
|---|---|---|---|---|
| 7,016,064 | B2* | 3/2006 | Iida et al. | 358/1.15 |
| 7,552,339 | B2 | 6/2009 | Sayama | |
| 2001/0007138 | A1* | 7/2001 | Iida et al. | 714/25 |
| 2003/0158764 | A1* | 8/2003 | Liao | 705/7 |
| 2004/0139316 | A1* | 7/2004 | Kotani | 713/156 |
| 2005/0229008 | A1* | 10/2005 | Crane | 713/186 |
| 2006/0053302 | A1* | 3/2006 | Yasaki et al. | 713/183 |
| 2006/0277414 | A1 | 12/2006 | Kotani et al. | |

FOREIGN PATENT DOCUMENTS

| EP | 1418485 A2 | 5/2004 |
|---|---|---|
| JP | 2003191575 | 7/2003 |
| JP | 2004-157790 A | 6/2004 |
| JP | 2005-317026 A | 11/2005 |
| JP | 2005311771 | 11/2005 |
| WO | 92/13295 A1 | 8/1992 |
| WO | 2005106620 | 11/2005 |

OTHER PUBLICATIONS

German Patent Office, Office Action dated Nov. 24, 2008.
German Office Action dated Nov. 29, 2007 and English Translation.
Japanese Office Action for Application No. 2006-158720 mailed Jul. 12, 2011.

* cited by examiner

*Primary Examiner* — Brandon Hoffman
*Assistant Examiner* — Michael D Anderson
(74) *Attorney, Agent, or Firm* — Lowe, Hauptman, Ham & Berner, LLP

(57) ABSTRACT

A TPM chip installed in an image reading apparatus records an operation log, and encrypts recorded operation log with a secret key. The image reading apparatus transmits encrypted operation log to an evaluation apparatus. The evaluation apparatus receives the encrypted operation log, decrypted received operation log, and evaluates an operation performed on the image reading apparatus based on decrypted operation log.

9 Claims, 6 Drawing Sheets

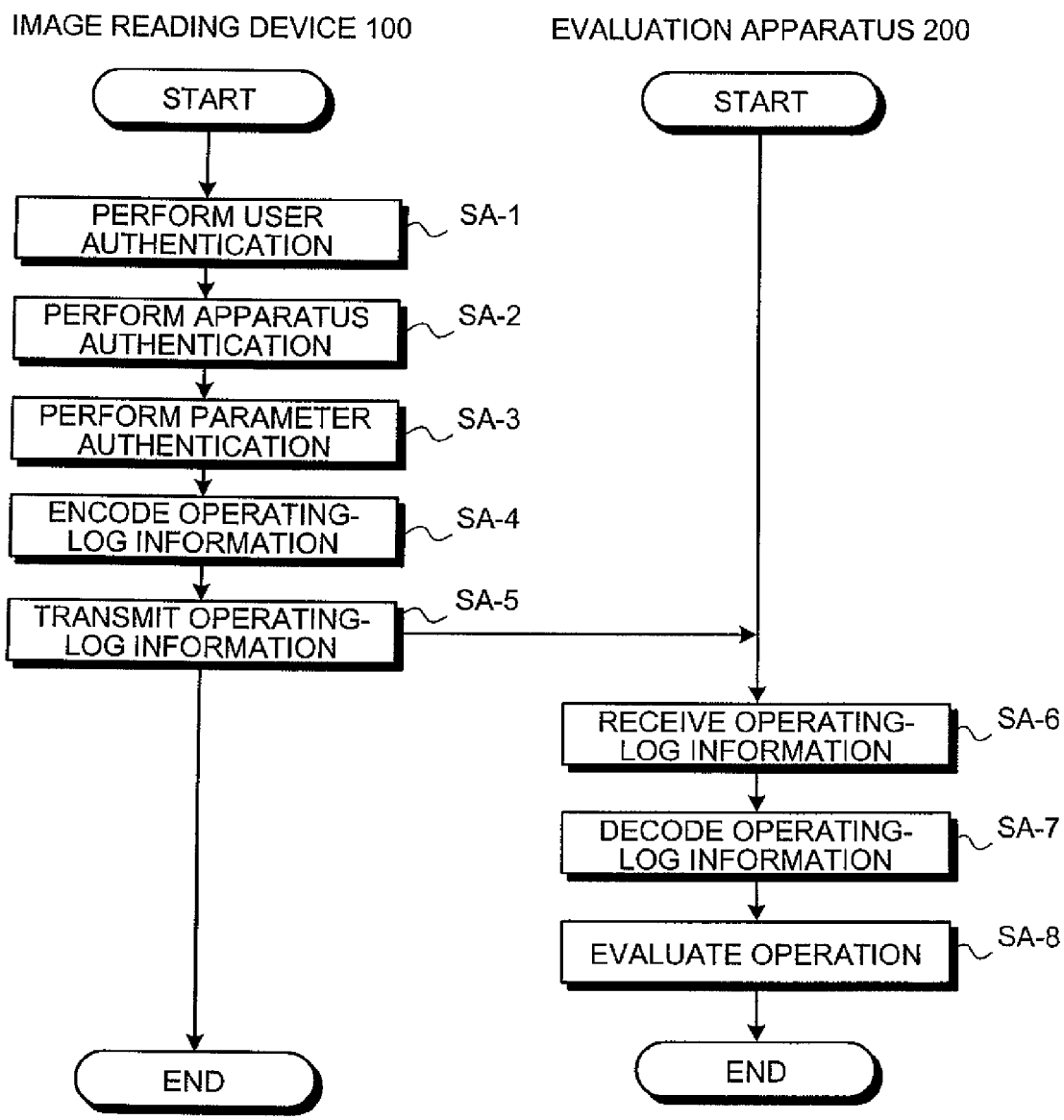

US 8,302,181 B2

IMAGE READING APPARATUS, AUTHENTICATION METHOD, EVALUATION SYSTEM, METHOD, AND COMPUTER PROGRAM PRODUCT

RELATED APPLICATIONS

The present application is based on, and claims priority from, Japan Application Number 2006-010356, filed Jan. 18, 2006 and Japan Application Number 2006-158720 filed Jun. 7, 2006 the disclosures of which are hereby incorporated by reference herein in their entirety.

BACKGROUND OF THE INVENTION

1. Field of the Invention

The present invention relates to a technology for assuring reliability and originality of information for evaluating an operation performed on an image reading apparatus.

2. Description of the Related Art

Authentication and an evaluation of an operation performed by a user, of an operating procedure, and of an operating parameter have been performed for an image reading apparatus. When the authentication and the evaluation are performed, it is necessary to assure, with precision, credibility, reliability, and an authorized original of information used for the authentication and the evaluation. For example, a personal computer directly connected to the image reading apparatus identifies an image reading apparatus and acquires information related to the operating parameters for the image reading apparatus, using predetermined driver software.

For a security enhancement independently promoted by each enterprise, a trusted computing group (TCG) as an industry organization of the enterprises that provide technologies for personal computer (PC) platforms contributes to develop and promote new hardware/software having higher reliability and security. Japanese Patent Application Laid-Open No. 2005-317026 discloses a technology with which the TCG determines a specification of a trusted platform module (TPM) chip related to a security chip for a computing platform. Further, the security can be improved by performing an authentication with a combination of a biometric authentication, an electronic certificate by a certificate authority, and an authentication of parameter information based on a class of usage parameter of an information processing apparatus. Japanese Patent Application Laid-Open No. 2004-157790 discloses a technology of a security determining method, a security determining system, and a security determining apparatus, which maintain appropriate security and realize a smooth transmitting and receiving of information.

However, according to the conventional technology, because the predetermined driver software has simply been used, information used for the evaluation can be fraudulently altered. Therefore, there is a problem that the credibility, the reliability, and the authorized original of the information used for the evaluation cannot be assured with precision.

SUMMARY OF THE INVENTION

It is an object of the present invention to at least partially solve the problems in the conventional technology.

An image reading apparatus according to one aspect of the present invention includes an acquiring unit that acquires user-identification information for identifying a user and a tamper-resistant chip. The tamper-resistant chip includes a storing unit that stores therein a secret key that is unique to the image reading apparatus, valid-user identification information for identifying a valid user who is permitted to operate the image reading apparatus, apparatus-specific information that is unique to the image reading apparatus, and apparatus environment information on a usage environment and an operating environment of the image reading apparatus; a collecting unit that collects the apparatus-specific information and the apparatus environment information; a user-authentication unit that performs authentication of the user by determining a validity of acquired user-identification information based on stored valid-user identification information; an apparatus-authentication unit that performs authentication of the image reading apparatus by determining a validity of collected apparatus-specific information based on stored apparatus-specific information; an environment-authentication unit that performs authentication of an apparatus environment of the image reading apparatus by determining a validity of collected apparatus environment information based on stored apparatus environment information; and an encrypting unit that encrypts information with stored secret key.

An evaluation system according to another aspect of the present invention is formed by connecting an image reading apparatus and an evaluation apparatus that evaluates an operation performed on the image reading apparatus via a network. The image reading apparatus includes an acquiring unit that acquires user-identification information for identifying a user and a tamper-resistant chip. The tamper-resistant chip includes a storing unit that stores therein a secret key that is unique to the image reading apparatus, valid-user identification information for identifying a valid user who is permitted to operate the image reading apparatus, apparatus-specific information that is unique to the image reading apparatus, and apparatus environment information on a usage environment and an operating environment of the image reading apparatus; a collecting unit that collects the apparatus-specific information and the apparatus environment information; a user-authentication unit that performs authentication of the user by determining a validity of acquired user-identification information based on stored valid-user identification information; an apparatus-authentication unit that performs authentication of the image reading apparatus by determining a validity of collected apparatus-specific information based on stored apparatus-specific information; an environment-authentication unit that performs authentication of an apparatus environment of the image reading apparatus by determining a validity of collected apparatus environment information based on stored apparatus environment information; an encrypting unit that encrypts information with stored secret key; and a transmitting unit that transmits information to the evaluation apparatus. The evaluation apparatus includes a receiving unit that receives encrypted apparatus environment information from the image reading apparatus; a decrypting unit that decrypts received apparatus environment information; and an evaluation unit that evaluates the operation performed on the image reading apparatus based on decrypted apparatus environment information.

An evaluation method according to still another aspect of the present invention is for an evaluation system that is formed by connecting an image reading apparatus and an evaluation apparatus that evaluates an operation performed on the image reading apparatus via a network. The evaluation method includes acquiring including the image reading apparatus acquiring user-identification information for identifying a user; performing including the image reading apparatus performing authentication of the user by determining a validity of acquired user-identification information based on valid-user identification information for identifying a valid user who is permitted to operate the image reading apparatus, which is stored in a tamper-resistant chip installed in the image reading apparatus; collecting including the image reading apparatus collecting, when it is determined that the acquired user-identification information is valid, apparatus-specific information that is unique to the image reading apparatus and apparatus environment information on a usage environment and an operating environment of the image reading apparatus; performing including the image reading apparatus performing authentication of the image reading apparatus by determining a validity of collected apparatus-specific information based on apparatus-specific information stored in the tamper-resistant chip; performing including the image reading apparatus performing authentication of an apparatus environment by determining a validity of collected apparatus environment information based on apparatus environment information stored in the tamper-resistant chip; encrypting including the image reading apparatus encrypting, when it is determined that the collected apparatus-specific information and the collected apparatus environment information are valid, the apparatus environment information with a secret key stored in the tamper-resistant chip; transmitting including the image reading apparatus transmitting encrypted apparatus environment information to the evaluation apparatus; receiving including the evaluation apparatus receiving the encrypted apparatus environment information from the image reading apparatus; decrypting including the evaluation apparatus decrypting received apparatus environment information; and evaluating including the evaluation apparatus evaluating the operation performed on the image reading apparatus based on decrypted apparatus environment information.

An authentication method according to still another aspect of the present invention includes acquiring user-identification information for identifying a user of an image reading apparatus; performing authentication of the user by determining a validity of acquired user-identification information based on valid-user identification information for identifying a valid user who is permitted to operate the image reading apparatus, which is stored in a tamper-resistant chip installed in the image reading apparatus; collecting, when it is determined that the acquired user-identification information is valid, apparatus-specific information that is unique to the image reading apparatus and apparatus environment information on a usage environment and an operating environment of the image reading apparatus; performing authentication of the image reading apparatus by determining a validity of collected apparatus-specific information based on apparatus-specific information stored in the tamper-resistant chip; performing authentication of an apparatus environment by determining a validity of collected apparatus environment information based on apparatus environment information stored in the tamper-resistant chip; encrypting, when it is determined that the collected apparatus-specific information and the collected apparatus environment information are valid, the apparatus environment information with a secret key stored in the tamper-resistant chip; and transmitting encrypted apparatus environment information to an evaluation apparatus.

A computer program product according to still another aspect of the present invention includes a computer usable medium having computer readable program codes embodied in the medium that when executed cause a computer to execute acquiring user-identification information for identifying a user of an image reading apparatus; performing authentication of the user by determining a validity of acquired user-identification information based on valid-user identification information for identifying a valid user who is permitted to operate the image reading apparatus, which is stored in a tamper-resistant chip installed in the image reading apparatus; collecting, when it is determined that the acquired user-identification information is valid, apparatus-specific information that is unique to the image reading apparatus and apparatus environment information on a usage environment and an operating environment of the image reading apparatus; performing authentication of the image reading apparatus by determining a validity of collected apparatus-specific information based on apparatus-specific information stored in the tamper-resistant chip; performing authentication of an apparatus environment by determining a validity of collected apparatus environment information based on apparatus environment information stored in the tamper-resistant chip; encrypting, when it is determined that the collected apparatus-specific information and the collected apparatus environment information are valid, the apparatus environment information with a secret key stored in the tamper-resistant chip; and transmitting encrypted apparatus environment information to an evaluation apparatus.

An evaluation method according to still another aspect of the present invention includes receiving encrypted apparatus environment information on a usage environment and an operating environment of an image reading apparatus; decrypting received apparatus environment information; and evaluating an operation performed on the image reading apparatus based on decrypted apparatus environment information.

A computer program product according to still another aspect of the present invention includes a computer usable medium having computer readable program codes embodied in the medium that when executed cause a computer to execute receiving encrypted apparatus environment information on a usage environment and an operating environment of an image reading apparatus; decrypting received apparatus environment information; and evaluating an operation performed on the image reading apparatus based on decrypted apparatus environment information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a flowchart of a processing procedure for an operation according to the present invention.

DETAILED DESCRIPTION OF THE PREFERRED EMBODIMENTS

Exemplary embodiments of the present invention are explained below in detail with reference to the accompanying drawings. The present invention is not limited to the embodiments explained below. For example, a TPM chip is explained as an example of a tamper-resistant chip according to the present invention. However the present invention is not thus limited.

Figure 1:
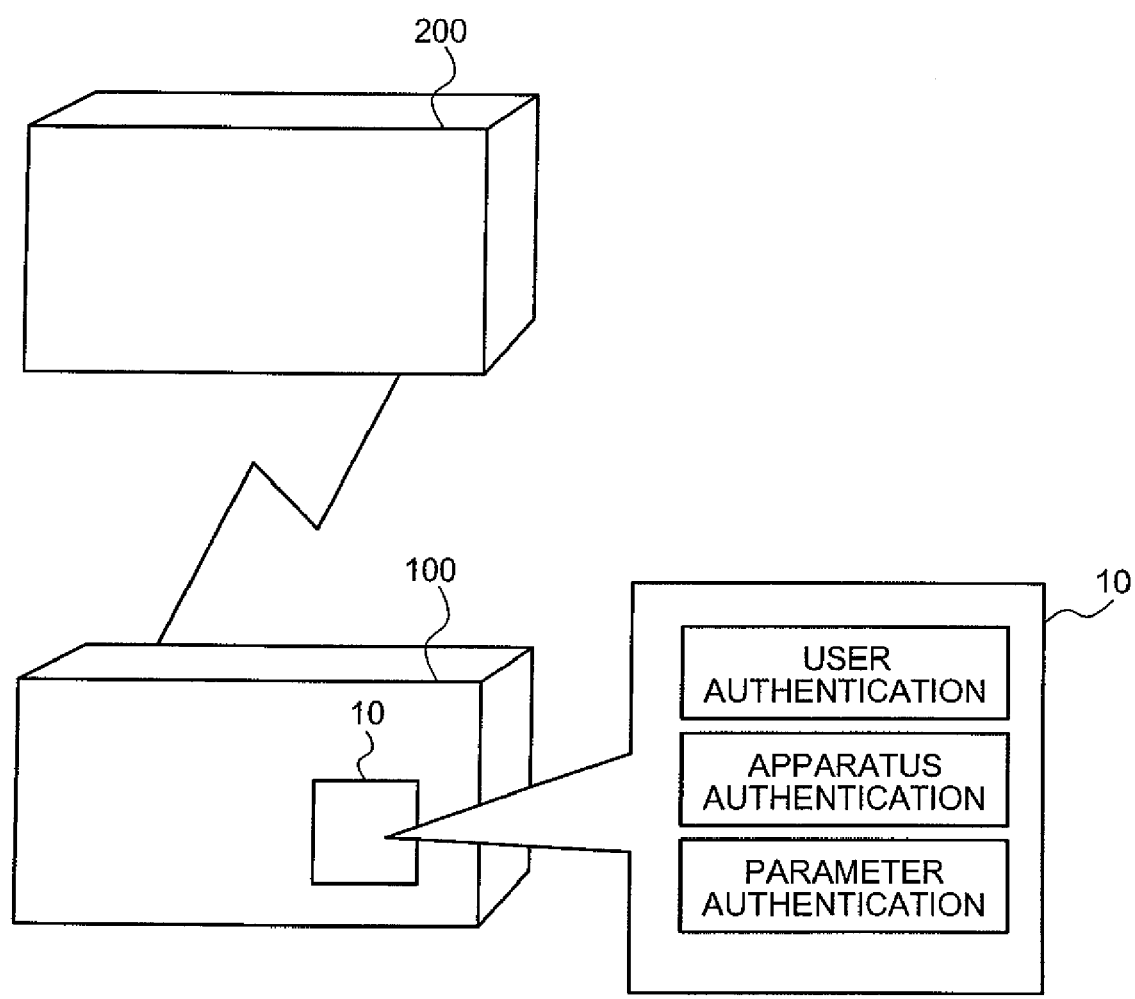
FIG. 1 is a schematic for explaining a general concept of the present invention.

FIG. 1 is a schematic for explaining a general concept of the present invention. A system according to the present invention generally includes following salient features. The system includes an image reading apparatus 100 provided in an apparatus such as a scanner, a printer, a multifunction product, and a facsimile apparatus and an evaluation apparatus 200 that evaluates an operation performed by a user for the image reading apparatus 100. The image reading apparatus 100 and the evaluation apparatus 200 are connected for a communication therebetween. The image reading apparatus 100 includes a TPM chip 10 as a tamper-resistant chip, an acquiring unit that acquires user-identification information to identify a user operating the image reading apparatus 100, and a transmitting unit that transmits the information.

The TPM chip 10 has a storage function, a collecting function, a user-authentication function, an apparatus-authentication function, a parameter-authentication function, and an encrypting function.

The storage function is for storing a secret key unique to the image reading apparatus 100, valid-user identification information (i.e., a password or a fingerprint) to identify an authorized-user for operating the image reading apparatus 100, apparatus-specific information unique to the image reading apparatus 100 (i.e., an apparatus identification number or a manufacturing number of the image reading apparatus 100), and apparatus-parameter information related to an apparatus parameter such as a usage parameter and an operating parameter, of the image reading apparatus 100.

The collecting function is for collecting the apparatus-specific information and the apparatus-parameter information such as an operating parameter including resolution, color/monochrome, document size, brightness, and contrast, for operating the image reading apparatus 100 and/or operating-log information (operating and processing information) including contents of the operation.

The user-authentication function is for determining whether the acquired user-identification information (i.e., a password or a fingerprint) for identifying the user operating the image reading apparatus 100 is correct based on the valid-user identification information stored with the storage function to perform a user authentication. Namely, the user-authentication function is for performing an authentication for identifying the user based on the user-identification information (identifies the user).

The apparatus-authentication function is for determining whether the apparatus-specific information collected with the collecting function is correct based on the apparatus-specific information stored with the storage function to perform an authentication of the image reading apparatus 100. Namely, the apparatus-authentication function is for performing an authentication of an authenticity of the image reading apparatus 100 based on the apparatus-specific information (identifies the apparatus).

The parameter-authentication function is for determining whether the apparatus-parameter information collected with the collecting function is correct based on the apparatus-parameter information stored with the storage function to perform an authentication of the apparatus parameter of the image reading apparatus 100.

The encrypting function is for creating an electronic signature and encrypting the information with the secret key.

The image reading apparatus 100 collects the operating-log information as the apparatus-parameter information with the TPM chip 10 and records the operating-log information into the TPM chip 10. The image reading apparatus 100 encrypts the recorded operating-log information with the TPM chip 10, using the secret key stored in the TPM chip 10. Thereafter, the image reading apparatus 100 transmits the encrypted operating-log information to the evaluation apparatus 200.

The evaluation apparatus 200 receives the operating-log information transmitted from the image reading apparatus 100. The evaluation apparatus 200 decrypts the received operating-log information and evaluates the operation performed by the user for the image reading apparatus 100 based on the decrypted operating-log information. Upon evaluating, the evaluation apparatus 200 can measure an operating time for a series of the operation performed by the user for the image reading apparatus 100, based on the decrypted operating-log information, can verify a consistency of an operating procedure of the operation performed by the user for the image reading apparatus 100, based on the decrypted operating-log information and predetermined operating-procedure information related to a correct operating procedure of the image reading apparatus 100, and can evaluate a proficiency of the operation performed by the user for the image reading apparatus 100 based on the measured operating time and a result obtained from the verification. The evaluation apparatus 200 can evaluate not only the proficiency but also validity and adequacy of the operation, and a qualification of the user.

Figure 2:
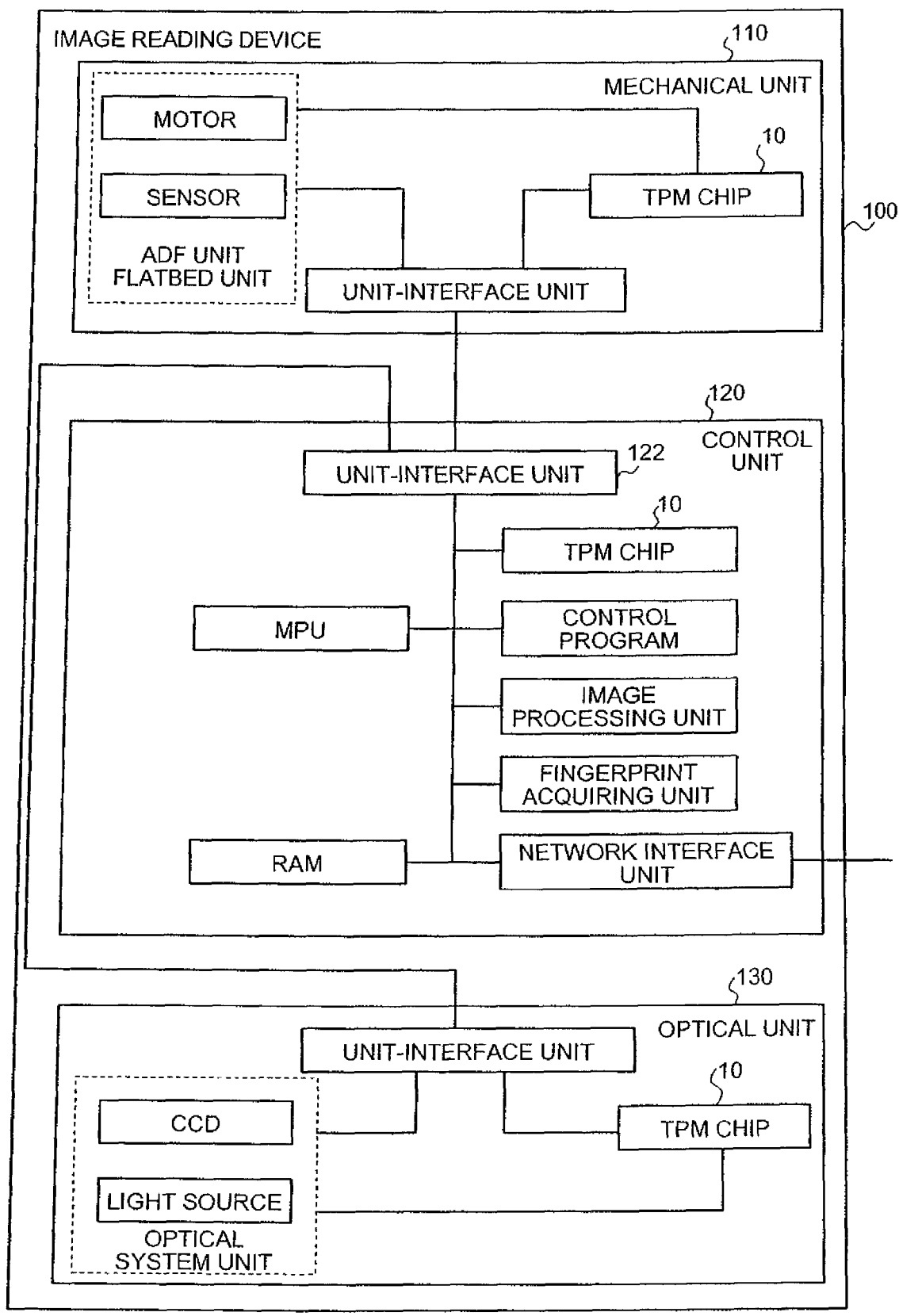
FIG. 2 is a block diagram of an image reading apparatus according to the present invention.

FIG. 2 is a block diagram of the image reading apparatus 100. Only a portion of a configuration of the image reading apparatus 100 is conceptually shown according to the present invention.

As shown in FIG. 2, the image reading apparatus 100 generally includes, as a minimal configuration, a mechanical unit 110, a control unit 120, and an optical unit 130. The image reading apparatus 100 includes the TPM chip 10 with respect to each unit for collecting information related to each unit and storing the information therein. In other words, the image reading apparatus 100 is configured with at least one unit and a plurality of units, and includes the TPM chip 10 with respect to each unit for acquiring unit-specific information of each unit (i.e., an apparatus-identification number or a manufacturing number), storing the acquired information, and adding the electronic signature to the information. The TPM chip 10 stores the unit-specific information such as a manufacturing number and the secret key necessary for creating the electronic signature and performing encrypting, and includes the user-authentication function, the apparatus-authentication function, and the parameter-authentication function. The TPM chip 10 is provided in a body of each unit so that the TPM chip 10 cannot easily be removed from outside. Also, it is configured that the unit cannot become active if the TPM chip 10 is removed.

The mechanical unit 110 includes and interconnects an auto document feeder (ADF) unit/flatbed unit including a motor and a sensor, the TPM chip 10, and a unit-interface unit for connecting the mechanical unit to other units.

The control unit 120 includes and interconnects a micro processing unit (MPU), a memory unit that stores a control program, an image processing unit, a fingerprint acquiring unit, a network interface unit, a random access memory (RAM), the TPM chip 10, and a unit-interface unit.

The optical unit 130 includes an optical system unit including a change coupled device (CCD) and a light source, and the TPM chip 10, which are interconnected via a unit-interface unit.

Figure 3:
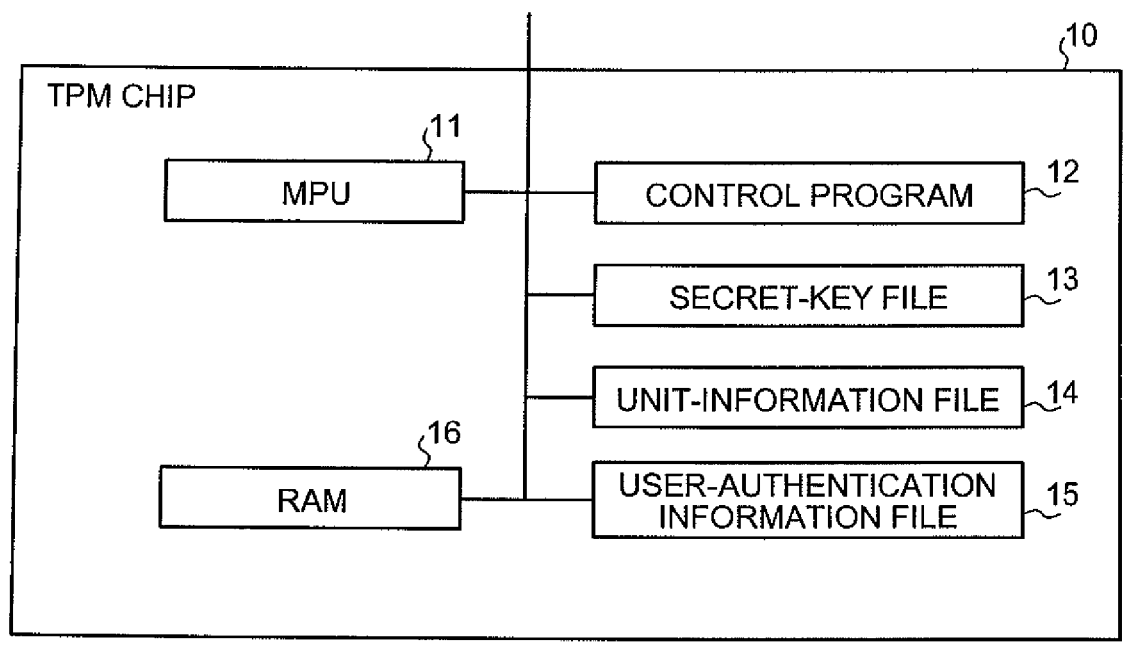
FIG. 3 is a block diagram of a TPM chip according to the present invention.

FIG. 3 is a block diagram of the TPM chip 10. Only a portion of a configuration of the TPM chip 10 is conceptually shown according to the present invention. As shown in FIG. 3, the TPM chip 10 includes, as a minimal configuration, an MPU 11, a control program 12 for controlling each unit, a secret-key file 13 for encrypting information, such as the apparatus information, with the secret key, a unit-information file 14 that stores the apparatus-identification number of each unit, a user-authentication information file 15 that stores a password and fingerprint information for authenticating a user, and a RAM 16 that stores the operating parameter for operating each unit and/or the operating-log information including the contents of the operation for operating the image reading apparatus 100, information related to an operating parameter, and information related to a unit parameter. The TPM chip 10 performs the collecting function, the user-authentication function, the apparatus-authentication function, the parameter-authentication function, and the encrypting function with the MPU 11.

Figure 4:
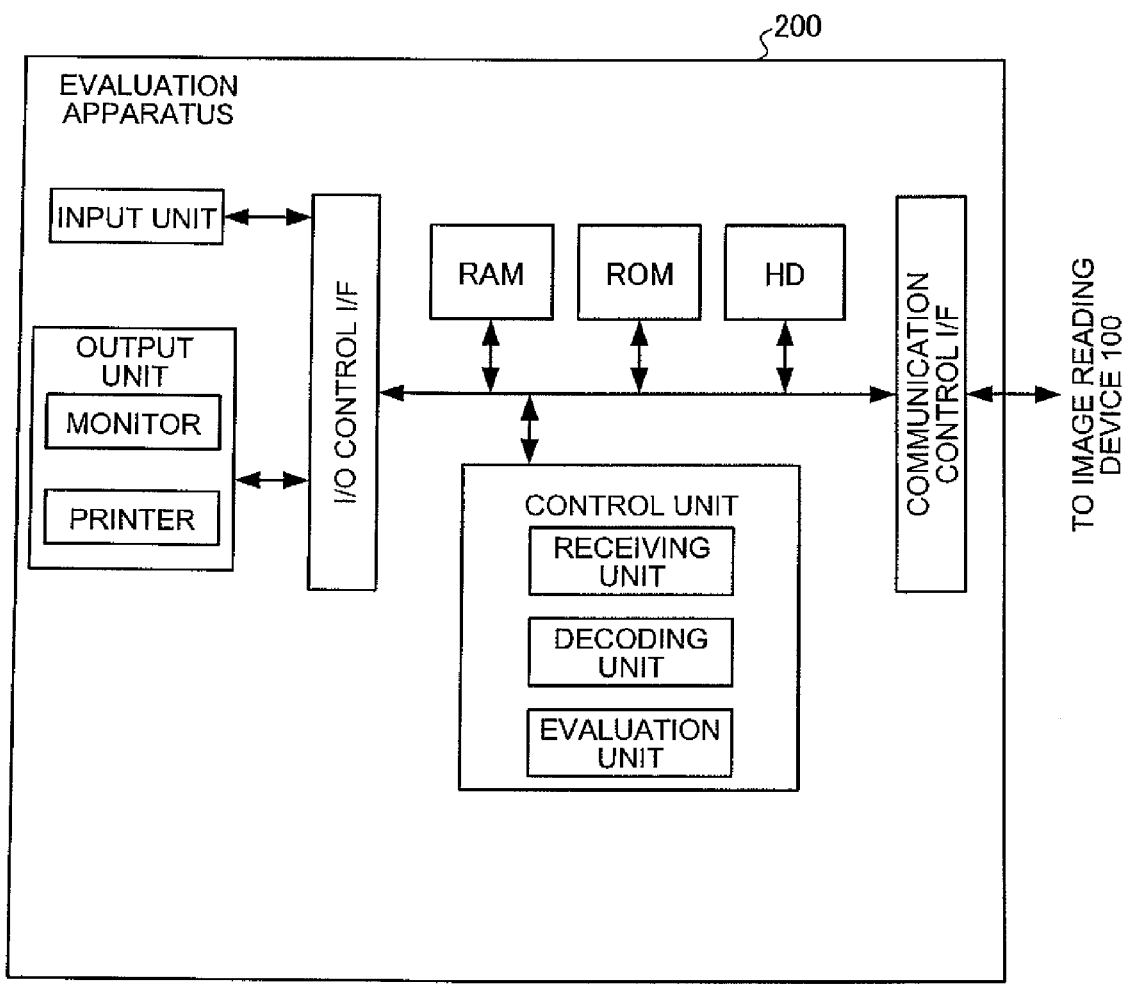
FIG. 4 is a block diagram of an evaluation apparatus according to the present invention.

FIG. 4 is a block diagram of the evaluation apparatus 200. Only a portion of a configuration of the evaluation apparatus 200 is conceptually shown according to the present invention. As shown in FIG. 4, the evaluation apparatus 200 includes, as a minimal configuration, a control unit including a central processing unit (CPU) that structures hardware, a storing unit including a hard disk drive and a memory unit such as a RAM and a read only memory (ROM), an input unit, an output unit (i.e., a monitor and a printer), an input/output (I/O) control interface, and a communication-control interface. Each function in the evaluation apparatus 200 is realized by programs controlling each unit and by each unit in the evaluation apparatus 200. A hardware structure of the evaluation apparatus 200 can be an information processing apparatus such as a workstation or a personal computer, which can be generally obtained from markets, and can be an attachment device of the information processing apparatus.

The control unit of the evaluation apparatus 200 includes, as a minimal configuration, a receiving unit that receives the encrypted apparatus-parameter information (specifically, the operating-log information) transmitted from the image reading apparatus 100, a decrypting unit that decrypts the apparatus-parameter information (specifically, the operating-log information) received by the receiving unit, an evaluation unit that evaluates an operation performed by the user for the image reading apparatus 100 based on the apparatus-parameter information (specifically, the operating-log information) decrypted by the decrypting unit. The evaluation unit includes an operating-time measuring unit, a consistency verifying unit, and a proficiency evaluation unit. The operating-time measuring unit measures an operating time of the operation performed by the user for the image reading apparatus 100 based on the operating-log information decrypted by the decrypting unit. The consistency verifying unit verifies a consistency of the operating procedure of the operation performed by the user for the image reading apparatus 100 based on the operating-log information decrypted by the decrypting unit and the predetermined operating-procedure information related to the correct operating procedure of the image reading apparatus 100. The proficiency evaluation unit evaluates the proficiency of the operation performed by the user for the image reading apparatus 100 based on the operating time measured by the operating-time measuring unit and a verification result obtained by the consistency verifying unit.

FIG. 5 is a flowchart of a processing procedure for an operation according to the present invention. The image reading apparatus 100 acquires a password or a fingerprint of the user operating the image reading apparatus 100 by a fingerprint acquiring unit in the control unit 120 and performs a user authentication with the user-authentication function of the TPM chip 10, based on the acquired password and the fingerprint (step SA-1, acquiring step and user authentication step).

When an authentication result obtained at step SA-1 is acceptable, the image reading apparatus 100 acquires and records the manufacturing number and the operating-log information with the collecting function of the TPM chip 10, and performs an apparatus authentication of the image reading apparatus 100 with the apparatus-authentication function of the TPM chip 10, based on the collected manufacturing number and the operating-log information (step SA-2, collecting step and apparatus authentication step). Thereafter, the image reading apparatus 100 performs an authentication of a parameter of the image reading apparatus 100 with the parameter-authentication function of the TMP chip 10, based on the collected operating-log information (step SA-3, collecting step and parameter authentication step).

When authentication results obtained at step SA-2 and step SA-3 are acceptable, the image reading apparatus 100 encrypts the operating-log information collected at step SA-3, with the secret key, using the encrypting function of the TPM chip 10 (step SA-4, encrypting step).

The image reading apparatus 100 transmits the operating-log information encrypted at step SA-4 to the evaluation apparatus 200 with the control unit 120, via the network interface unit (step SA-5, transmitting step).

The evaluation apparatus 200 receives the operating-log information transmitted from the image reading apparatus 100 by the receiving unit in the control unit of the evaluation apparatus 200 (step SA-6, receiving step).

The evaluation apparatus 200 decrypts the operating-log information, by the decrypting unit in the control unit of the evaluation apparatus 200, using a corresponding decrypting key (i.e., public key) (step SA-7, decrypting step).

The evaluation apparatus 200 evaluates the operation performed by the user for the image reading apparatus 100, based on the operating-log information decrypted at step SA-7, by the evaluation unit in the control unit of the evaluation apparatus 200 (step SA-8, evaluating step).

At step SA-8, the evaluation unit can measure the operating time of the operation performed by the user for the image reading apparatus 100 at the operating-time measuring unit, based on the operating-log information decrypted at step SA-7. Further, the evaluation unit can verify the consistency of the operating procedure of the operation performed by the user for the image reading apparatus 100 at the consistency verifying unit, based on the operating-log information decrypted at step SA-7 and the predetermined operating-procedure information related to the correct operating procedure of the image reading apparatus. Thereafter, the evaluation unit can evaluate the proficiency of the operation performed by the user for the image reading apparatus 100 at the proficiency evaluation unit, based on the operating time measured by the operating-time measuring unit and the verification result obtained by the consistency verifying unit.

Figure 6A:
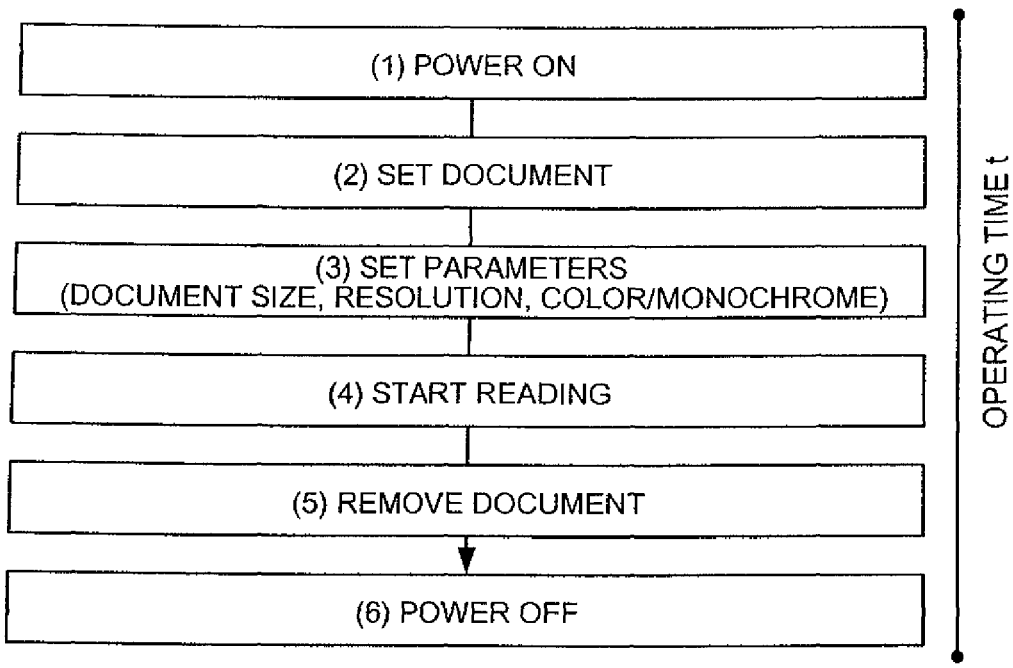
FIGS. 6A and 6B are schematics for explaining operations performed by a consistency verifying unit in the evaluation apparatus.
Figure 6B:
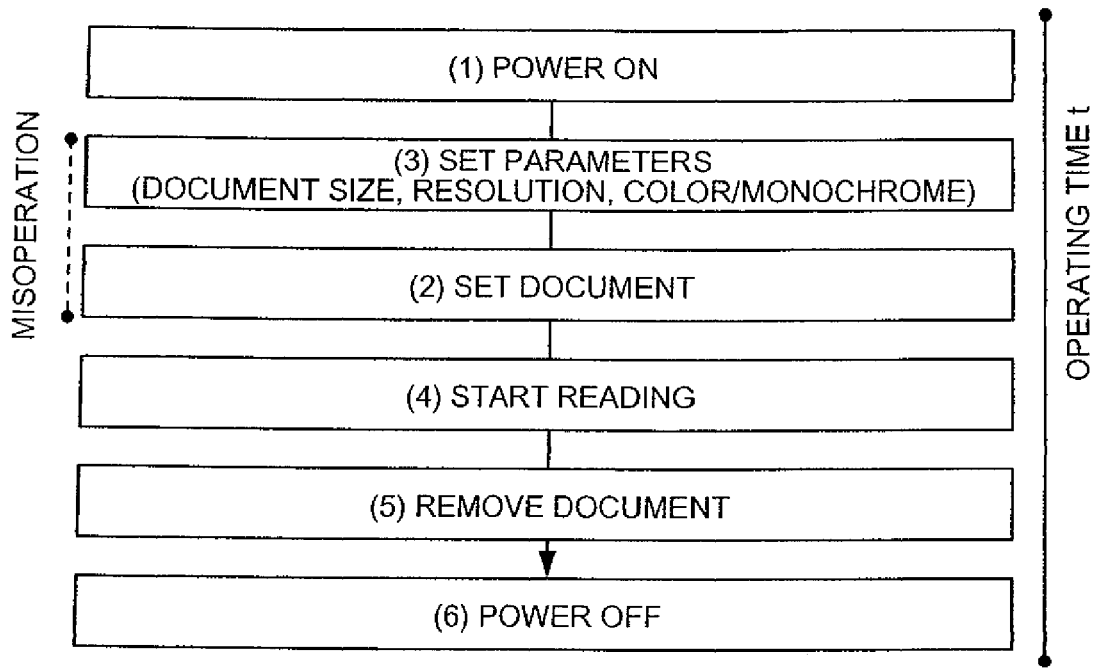

More specifically, the evaluation unit analyzes the operating-log information related to an operating sequence performed by the user shown in FIG. 6B and measures the operating time (operating time "t" shown in FIG. 6B) by the operating-time measuring unit. The evaluation unit compares and analyzes the operating-log information related to the operating sequence performed by the user shown in FIG. 6B and the operating-procedure information related to a correct operating sequence shown in FIG. 6A to detect an error in the operating procedure, and verifies the consistency of the operation performed by the user for the image reading apparatus 100, by the consistency verifying unit. Thereafter, the evaluation unit evaluates the proficiency, based on the operating time measured by the operating-time measuring unit and the verification result obtained by the consistency verifying unit, by the proficiency evaluation unit. Further, the evaluation unit can detect frequency of an occurrence of a failure based on the operating-log information and can evaluate the proficiency based on the operating sequence of the user, the operating time, and the frequency of the occurrence of a failure.

As explained above, according to the present invention, the image reading apparatus 100 performs the user authentication with the user-authentication function of the TPM chip 10, performs the apparatus authentication of the image reading apparatus 100 with the apparatus-authentication function of the TPM chip 10, and performs the parameter authentication of the image reading apparatus 100 with the parameter-authentication function of the TPM chip 10. Further, the image reading apparatus 100 records the operating-log information collected by the collecting function of the TPM chip 10 and encrypts the recorded operating-log information by the secret key with the encrypting function of the TPM chip 10. The image reading apparatus 100 transmits the encrypted operating-log information to the evaluation apparatus 200 by the control unit 120. The evaluation apparatus 200 receives the operating-log information transmitted from the image reading apparatus 100 by the receiving unit, decrypts the received operating-log information by the decrypting unit, and evaluates the operation performed by the user for the image reading apparatus 100, based on the decrypted operating-log information, by the evaluation unit. As a result, when the operation performed by the user for the image reading apparatus 100 is evaluated, credibility, reliability, and an authorized original of the information used for the evaluation can be assured with precision.

The present invention in its broader aspects is not limited to the specific details and representative embodiments shown and described herein. Accordingly, various modifications may be made without departing from the spirit or scope of the general inventive concept as defined by the appended claims and their equivalents. For example, of the various types of processing explained in the description of the exemplary embodiments, it is acceptable to manually perform a part or all of the processing that is explained to be performed automatically. Conversely, it is acceptable to automatically perform, using a publicly-known technique, a part or all of the processing that is explained to be performed manually.

In addition, the processing procedures, the control procedures, the specific names, the information including various types of data and parameters, the images, and the database structures that are presented in the text and the drawings can be modified in any form, except when it is noted otherwise.

The constituent elements of the apparatuses shown in the drawings are based on functional concepts. The constituent elements do not necessarily have to be physically arranged in the way shown in the drawings. For example, a part or all of the processing functions offered by the apparatuses may be realized by a CPU and a program analyzed and executed by the CPU, or may be realized as hardware with wired logic. The programs are recorded in the recording medium, explained later, and to be mechanically retrieved by the control unit as required.

A computer program that gives an instruction to the CPU in association with an operating system (OS) for performing various processing is stored in a storing unit such as a ROM or a hard disk (HD). The computer program is loaded into the RAM to be executed, and implements the control unit in cooperation with the CPU. The computer program can be stored in an application program server connected via a network and a part of or the entire computer program can be downloaded as required.

The computer program according to the present invention can be stored into a computer-readable recording medium including a removable physical medium, a built-in physical medium, and a communication medium that holds the program for a short time. The removable physical medium includes a flexible disk (FD), and magneto optical (MO) disk, a ROM, an erasable programmable read only memory (EPROM), an electrically erasable programmable read only memory (EEPROM), a compact disk-read only memory (CD-ROM), or a digital versatile disk (DVD). The built-in physical medium includes a ROM, a RAM, or a HD that is installed in the computer system. The communication medium includes a communication line or a carrier for transmitting the program via a network such as a local area network (LAN), a wide area network (WAN), or the Internet. The program is a data processing method written in arbitrary languages in arbitrary written formats, leading that both a source code and a binary code can be acceptable. The program is not necessarily prepared in a single structure and can be separately prepared as a plurality of modules or libraries. Also, programs that realize the functions in association with other programs such as an OS can be included. The specific configurations for reading the recording medium in each unit according to the embodiments, reading procedures, and install procedures after the reading can be known configurations and procedures.

The specific mode in which the apparatuses are distributed and integrated is not limited to the ones shown in the drawings. A part or all of the apparatuses may be distributed or integrated functionally or physically in any arbitrary units, according to various loads and the status of use. For example, each database can be independently structured as an independent database apparatus and a part of the processing can be realized by a common gateway interface (CGI).

According to an embodiment of the present invention, when an operation performed by a user for the image reading apparatus is evaluated, credibility, reliability, and an authorized original of information used for the evaluation can be assured with precision.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus, comprising:
   an acquiring unit for acquiring user-identification information for identifying a user; and
   a tamper-resistant chip including
      a storing unit that stores therein
         a secret key that is unique to the image reading apparatus;
         valid-user identification information for identifying a valid user who is permitted to operate the image reading apparatus;
         apparatus-specific information that is unique to the image reading apparatus; and
         apparatus environment information including (i) an operating parameter, including at least one of resolution, color/monochrome, document size, or contrast, for an operation of the image reading apparatus and (ii) operating-log information including contents of the operation, wherein the operation described by the operating parameter is not a user-authentication operation;

a collecting unit for collecting apparatus-specific information and apparatus environment information;

a user-authentication unit for performing authentication of the user by determining whether the acquired user-identification information is correct based on the stored valid-user identification information;

an apparatus-authentication unit for performing authentication of the image reading apparatus by determining whether the collected apparatus-specific information is correct based on the stored apparatus-specific information;

an environment-authentication unit for performing authentication of an apparatus environment of the image reading apparatus by determining whether any one or both of the collected operating parameter and the collected operating-log information are correct based on the stored operating parameter and the stored operating-log information; and an encrypting unit for encrypting information with the stored secret key.

2. An evaluation system, comprising:

an image reading apparatus; and an evaluation apparatus connected to the image reading apparatus via a network for evaluating an operation performed on the image reading apparatus, wherein the image reading apparatus includes an acquiring unit for acquiring user-identification information for identifying a user; and a tamper-resistant chip including a storing unit that stores therein 1) a secret key that is unique to the image reading apparatus, 2) valid-user identification information for identifying a valid user who is permitted to operate the image reading apparatus, 3) apparatus-specific information that is unique to the image reading apparatus, and 4) apparatus environment information including (i) an operating parameter, including at least one of resolution, color/monochrome, document size, or contrast, for an operation of the image reading apparatus and (ii) operating-log information including contents of the operation, wherein the operation described by the operating parameter is not a user-authentication operation;

a collecting unit for collecting apparatus-specific information and apparatus environment information;

a user-authentication unit for performing authentication of the user by determining whether the acquired user-identification information is correct based on the stored valid-user identification information;

an apparatus-authentication unit for performing authentication of the image reading apparatus by determining whether the collected apparatus-specific information is correct based on the stored apparatus-specific information;

an environment-authentication unit for performing authentication of an apparatus environment of the image reading apparatus by determining whether any one or both of the collected operating parameter and the collected operating-log information are correct based on the stored operating parameter and the stored operating-log information; and an encrypting unit for encrypting apparatus environment information with the stored secret key; and a transmitting unit for transmitting the encrypted apparatus environment information to the evaluation apparatus, and the evaluation apparatus includes a receiving unit for receiving the encrypted apparatus environment information from the image reading apparatus;

a decrypting unit for decrypting the received apparatus environment information; and an evaluation unit for evaluating the operation performed on the image reading apparatus based on the decrypted apparatus environment information.

3. The evaluation system according to claim 2, wherein the evaluation unit further includes an operating-time measuring unit for measuring an operating time of the image reading apparatus based on the operating-log information;

a consistency-verifying unit for verifying a consistency of an operating procedure performed on the image reading apparatus based on the operating-log information and predetermined operating-procedure information on a correct operating procedure; and a proficiency evaluation unit for evaluating a proficiency of the operation performed on the image reading apparatus based on the measured operating time and a result of verification by the consistency-verifying unit.

4. An evaluation method for an evaluation system that comprises an image reading apparatus and an evaluation apparatus connected to the image reading apparatus via a network for evaluating an operation performed on the image reading apparatus, the evaluation method comprising:

the image reading apparatus acquiring user-identification information for identifying a user;

the image reading apparatus performing authentication of the user by determining whether the acquired user-identification information is correct based on valid-user identification information for identifying a valid user who is permitted to operate the image reading apparatus, the valid-user identification information being stored in a tamper-resistant chip installed in the image reading apparatus;

the image reading apparatus collecting, when it is determined that the acquired user-identification information is valid, (i) apparatus-specific information that is unique to the image reading apparatus and (ii) apparatus environment information including (ii1) an operating parameter, including at least one of resolution, color/monochrome, document size, or contrast, for an operation of the image reading apparatus and (ii2) operating-log information including contents of the operation, wherein the operation described by the operating parameter is not a user-authentication operation;

the image reading apparatus performing authentication of the image reading apparatus by determining whether the collected apparatus-specific information is correct based on apparatus-specific information stored in the tamper-resistant chip;

the image reading apparatus performing authentication of an apparatus environment by determining whether any one or both of the collected operating parameter and the collected operating-log information are correct based on apparatus environment information stored in the tamper-resistant chip;

the image reading apparatus encrypting, when it is determined that the collected apparatus-specific information and the collected apparatus environment information are valid, the apparatus environment information with a secret key stored in the tamper-resistant chip;

the image reading apparatus transmitting the encrypted apparatus environment information to the evaluation apparatus;

the evaluation apparatus receiving the encrypted apparatus environment information from the image reading apparatus;

the evaluation apparatus decrypting the received apparatus environment information; and the evaluation apparatus evaluating the operation performed on the image reading apparatus based on the decrypted apparatus environment information.

5. The evaluation method according to claim 4, wherein the evaluation apparatus evaluates the operation performed on the image reading apparatus by
  measuring an operating time of the image reading apparatus based on the operating-log information;
  verifying a consistency of an operating procedure performed on the image reading apparatus based on the operating-log information and predetermined operating-procedure information on a correct operating procedure; and
  evaluating a proficiency of the operation performed on the image reading apparatus based on the measured operating time and a result of verification at the verifying.

6. An authentication method, comprising:
  acquiring user-identification information for identifying a user of an image reading apparatus;
  performing authentication of the user by determining whether the acquired user-identification information is correct based on valid-user identification information for identifying a valid user who is permitted to operate the image reading apparatus, the valid-user identification information being stored in a tamper-resistant chip installed in the image reading apparatus;
  collecting, when it is determined that the acquired user-identification information is valid, (i) apparatus-specific information that is unique to the image reading apparatus and (ii) apparatus environment information including (ii1) an operating parameter, including at least one of resolution, color/monochrome, document size, or contrast, for an operation of the image reading apparatus and (ii2) operating-log information including contents of the operation, wherein the operation described by the operating parameter is not a user-authentication operation;
  performing authentication of the image reading apparatus by determining whether the collected apparatus-specific information is correct based on apparatus-specific information stored in the tamper-resistant chip;
  performing authentication of an apparatus environment by determining whether the collected apparatus-specific information is correct based on apparatus environment information stored in the tamper-resistant chip;
  encrypting, when it is determined that the collected apparatus-specific information and the collected apparatus environment information are valid, the apparatus environment information with a secret key stored in the tamper-resistant chip; and
  transmitting the encrypted apparatus environment information to an evaluation apparatus.

7. A non-transitory computer-readable recording medium having a program for causing a computer to execute an authentication method, comprising:
  acquiring user-identification information for identifying a user of an image reading apparatus;
  performing authentication of the user by determining whether the acquired user-identification information is correct based on valid-user identification information for identifying a valid user who is permitted to operate the image reading apparatus, the valid-user identification information being stored in a tamper-resistant chip installed in the image reading apparatus;
  collecting, when it is determined that the acquired user-identification information is valid, (i) apparatus-specific information that is unique to the image reading apparatus and (ii) apparatus environment information including (ii1) an operating parameter, including at least one of resolution, color/monochrome, document size, or contrast, for an operation of the image reading apparatus and (ii2) operating-log information including contents of the operation, wherein the operation described by the operating parameter is not a user-authentication operation;
  performing authentication of the image reading apparatus by determining whether the collected apparatus-specific information is correct based on apparatus-specific information stored in the tamper-resistant chip;
  performing authentication of an apparatus environment by determining whether the collected apparatus-specific information is correct based on apparatus environment information stored in the tamper-resistant chip;
  encrypting, when it is determined that the collected apparatus-specific information and the collected apparatus environment information are valid, the apparatus environment information with a secret key stored in the tamper-resistant chip; and
  transmitting the encrypted apparatus environment information to an evaluation apparatus.

8. An evaluation method, comprising:
  receiving encrypted apparatus environment information including (i) an operating parameter, including at least one of resolution, color/monochrome, document size, or contrast, for an operation of the image reading apparatus and (ii) operating-log information including contents of the operation, wherein the operation described by the operating parameter is not a user-authentication operation;
  decrypting the received apparatus environment information; and
  evaluating an operation performed on the image reading apparatus based on the decrypted apparatus environment information.

9. A non-transitory computer-readable recording medium having a program for causing a computer to execute an evaluation method, comprising:
  receiving encrypted apparatus environment information including (i) an operating parameter, including at least one of resolution, color/monochrome, document size, or contrast, for an operation of the image reading apparatus and (ii) operating-log information including contents of the operation, wherein the operation described by the operating parameter is not a user-authentication operation;
  decrypting the received apparatus environment information; and
  evaluating an operation performed on the image reading apparatus based on the decrypted apparatus environment information.

* * * * *